United States Patent Office 3,732,275
Patented May 8, 1973

3,732,275
SEPARATING PHTHALONITRILES FROM REACTION GASES CONTAINING THE SAME
Rolf Platz, Mannheim, and Martin Decker, Gert Buerger, and Hanns-Helge Stechl, Ludwigshafen, Germany, assignors to Badische Anilin- & Soda-Fabrik Aktiengesellschaft, Ludwigshafen (Rhine), Germany
No Drawing. Continuation-in-part of abandoned application Ser. No. 726,563, May 3, 1968. This application Dec. 30, 1970, Ser. No. 102,925
Int. Cl. C07c *121/56*
U.S. Cl. 260—465 B 4 Claims

ABSTRACT OF THE DISCLOSURE

An improved process for the recovery of phthalonitriles from hot reaction gases containing the same by contacting the hot reaction gases with a coolant which is at a temperature of from 40° to 200° C. and cooling them down at a rate of more than 350° C. per second, the coolant being water, benzonitrile or o-tolunitrile which from recycling contains 2 to 40% phthalonitriles. o-Phthalonitrile is suitable for the production of phthalocyanines which are valuable pigments; terephthalonitrile and isophthalonitriles can be reduced to the corresponding diamines which are starting materials for the manufacture of polyamides which can be used for the production of fibers.

---

This application is a continuation-in-part of U.S. application Ser. No. 726,563 filed on May 3, 1968, now abandoned.

This invention relates to a process for recovering phthalonitriles from hot reaction gases such as are obtained in the production of dinitriles from xylenes with air and in the presence of ammonia or from the corresponding phthalic acids (in the case of orthophthalic acid also from phthalic anhydride) and ammonia.

It is known from U.S. Pat. 2,232,836 that phthalonitriles can be deposited in solid form and recovered from hot reaction gases containing the same by injecting cold water (i.e. by quenching). The water is supplied at a temperature of from 1° to 3° C. and the temperature of the suspension of solid phthalonitrile in water formed by quenching is kept below 25° C. A special cooling facility is required for such a method because this temperature is not necessarily achieved in the conventional conditioning zones. Cooling units are however expensive to install and operate. In the separation of o-phthalonitrile, phthalimide contained as a byproduct is separated with the o-phthalonitrile because it is insoluble in water at the said temperature. Moreover the separation of any condensed xylenes offers certain difficulties at the low temperature of the separation because of the formation of an emulsion.

It is an object of the invention to provide a process for the recovery of phthalonitriles from hot reaction gases containing the same by quenching with collants in which process no special cooling facilities for the collant are necessary. It is another object of the invention to provide a process for the recovery of phthalonitriles from hot gases containing the same and having a composition similar to that of reaction gases originating from the oxidation of xylenes with air in the presence of ammonia at elevated temperature, by quenching with a coolant in which the phthalonitrile can be readily separated from the mixture obtained by quenching. It is moreover an object of the invention to provide a method for the recovery of o-phthalonitrile having a low content of phthalimides. These and other objects and advantages of the invention will be evident to those skilled in the art from the following detailed description.

We have found that phthalonitriles, such as isophthalonitrile, terephthalonitrile and particularly o-phthalonitrile, can be recovered in one stage with simultaneous removal of byproducts from reaction gas containing phthalonitriles and having a temperature of 430° to 470° C. (such as are obtained in the catalytic reaction of xylenes with ammonia and oxygen in the vapor phase or in the dehydration of ammonium salts of phthalic acids) by cooling down the hot reaction gas in a quenching zone at a rate of more than 350° C. per second with a coolant selected from the group consisting of tolunitrile, benzonitrile and water, said coolant containing 2 to 40% by weight of phthalonitriles and being supplied at a temperature of from 40° to 200° C. in liquid form as a solution or suspension, the ratio of said coolant to the amount of gas to be quenched being in the range of 1:5 to 1:100 and being such that a temperature below the boiling point of the coolant is maintained by evaporation of a portion of the coolant, and thereafter recovering said phthalonitriles from part of said coolant and recycling the rest to the quenching zone together with the coolant from which the phthalodinitriles have been isolated.

The reaction gas to be processed and originating from the synthesis of phthalonitrile in general has a temperature of from 180° to 480° C., particularly from 430° to 470° C., and contains 5 to 45 g., particularly 8 to 30 g., of phthalonitrile per m.$^3$ (S.T.P.) 5 to 550 g. of water per m.$^3$ (S.T.P.), 10 to 80% by volume of ammonia, 0 to 1% by volume of oxygen and/or other gases, such as 10 to 90% by volume of nitrogen, 0.5 to 10% by volume of carbon monoxide and 0.5 to 10% by volume of carbon dioxide.

The ratio of the volume of coolant to the volume of the hot reaction gas is chosen so that a defined temperature below the boiling point of the coolant, advantageously from 20° to 70° C. below the boiling point of the coolant, is maintained by evaporation of a portion of the coolant. The volumetric ratio may be for example from 1:5 to 1:100, advantageously from 1:5 to 1:50. When tolunitrile or benzonitrile is used as coolant, temperatures in the range of from 140° to 180° C. are set up. When water is used as the coolant it is advisable to keep the temperature in the cooling chamber in the range of from 40° to 80° C.

It has proved to be advantageous to dimension the cooling chamber so that the residence time of the reaction gas to be cooled in the cooling chamber is from 0.1 to 10 minutes, preferably from 1 to 5 minutes. In this way the coolant, particularly when using water at from 50° to 70° C., can be prevented from forming aerosols. In any case, cooling in the quenching zone is very rapid, being at the rate of more than 350° C. per second.

When using water as the coolant it has also proved to be advantageous to adjust the pH within a range of from 7 to 11. This can be effected for example by adding acids such as hydrochloric acid or sulfonic acid or ammonium salts of acids hydrolyzing to an acidic medium or by allowing about 3 to 8% by weight of phthalamic acid or phthalic acid to form in the solution. When using coolants which are only weakly alkaline to neutral there is practically no hydrolysis of the phthalonitrile in spite of the presence of ammonia.

It is also advantageous not to have too small a content of ammonium carbonate in the coolant so that the solubility of phthalonitrile in the cooling medium is suppressed. As a rule therefore an ammonium carbonate level of more than 3 but not more than 12% by weight is maintained, especially when using water as the coolant, all the more so as hydrolysis of the dinitrile is further decreased by this measure.

The process according to this invention may be carried out for example by passing hot reaction gas containing phthalonitrile cocurrent with the coolant through a scrubber or by passing hot reaction gas into the bottom of a scrubber and injecting coolant at the top of the scrubber through one or more nozzles. The coolant containing 2 to 40% of phthalonitrile is returned to the scrubber. When water is used, the coolant is a suspension of phthalonitrile in water, the concentration being preferably 2 to 20% by weight. When using nitrile coolants, the recycle coolant contains the phthalonitrile dissolved therein, preferably to an extent of 10 to 35% by weight.

In order to adjust the phthalonitrile concentration a bleed stream is passed through a cooler to a filtration unit or centrifuge and the suspended phthalonitrile contained therein is separated. The filtrate, from which a portion can be bled for production of ammonium carbonate, is returned to the scrubber after it has been replenished with makeup condensate.

It is possible with the process according to this invention to recover phthalonitriles continuously and free from contaminants from hot reaction gas much more cheaply than has been possible hitherto. The phthalonitrile is obtained, particularly when using water, as a fine suspension and may be processed, after it has been filtered off, into a dry end product without any size reduction. When organic coolants are used, the phthalonitriles are obtained in dissolved form; they are then obtained as solids by crystallization at low temperatures or by removal of the solvent by distillation.

Phthalonitriles are obtained in a purity of from 99 to 100% because some of the byproducts such as tolunitrile, benzonitrile or xylene are not condensed and other byproducts, such as diamide, imide and ammonium phthalamate are hydrolyzed into compounds which are soluble in water.

The invention is further illustrated by the following Examples in which the parts specified are parts by weight unless stated otherwise; they bear the same relation to parts by volume as the kilogram to the liter (S.T.P.).

EXAMPLE 1

200,000 parts by volume of hot reaction gas which is at 460° C. and contains 1.92% by volume of o-phthalonitrile is passed per hour into the top of a scrubber. At the same time 30,000 parts by volume of water at 70° C. containing 30% by weight of phthalonitrile is metered in per hour at the top of the scrubber. The water is finely dispersed through a nozzle and therefore comes into intimate contact with the reaction gas. The heat evolved is removed by evaporating the appropriate amount of water so that the above-mentioned temperature can be maintained. A bleed stream is withdrawn, 21.5 parts of phthalonitrile per hour is separated therefrom by filtration and a suspension having the above phthalonitrile concentration is recycled. Since a residence time of 1 minute is available for the reaction gas in the scrubber, the gas is freed from phthalonitrile without any residue. The purity of the phthalonitrile obtained is from 99.6 to 100%.

EXAMPLE 2

200,000 parts by volume of reaction gas which is at 460° C. and contains 1.92% by volume of o-phthalonitrile vapor is passed per hour into the top of a scrubber. At the same time 30,000 parts by volume of an aqueous suspension containing from 50 to 100 g. o-phthalonitrile per liter is fed at 70-76° C. to the top of a scrubber and sprayed through two nozzles so that the entire cross-section of the scrubber is covered. The sensible heat and the heat of crystallization of the o-phthalonitrile are removed by evaporation of water. The o-phthalonitrile suspension collecting at the bottom of the scrubber is returned to the nozzles at the top.

In order to maintain the concentration between 5 and 10%, some of the suspension is cooled from 75° to 10–20° C. in a scraper crystallizer and the solid separated in a centrifuge. 21.5 parts per hour of o-phthalonitrile having a purity of 99.6 to 100% is obtained.

EXAMPLE 3

600 parts by volume of reaction gas which is at 470° C. and contains 1.76% by volume of o-phthalonitrile vapor is fed into a scrubber. At the same time 50 parts by volume of o-tolunitrile which is at 80 to 90° C. and contains 300 g./l. of o-phthalonitrile is sprayed through a nozzle at the top of the scrubber, the temperature of the reaction gas being lowered to that of the quenching medium in a fraction of a second. The quenching liquid is returned to the quenching zone. To maintain the said phthalonitrile concentration, some of the o-tolunitrile is withdraw each hour and the phthalonitrile crystallized by cooling to approx. 20° C. After the solid has been separated, the filtrate is returned to the cycle. 61 parts by weight of high-purity o-phthalonitrile containing only a small amount of o-tolunitrile is obtained per hour.

Similar results are obtained by substituting benzonitrile for o-tolunitrile.

We claim:
1. A process for separating phthalonitriles from a reaction gas which contains phthalonitriles, said reaction gas having a temperature of from 430 to 470° C. and having been obtained by the catalytic reaction of xylenes with ammonia and oxygen in the vapor phase or by the dehydration of ammonium phthalates, which process comprises:

continuously cooling the hot reaction gas in a quenching zone at a rate of more than 350° C. per second with a liquid coolant selected from the group consisting of water, benzonitrile and tolunitrile, said coolant containing 2 to 40 percent by weight of phthalonitriles as a solution or suspension and being supplied to the quenching zone at a temperature of from 40 to 80° C. when it is based on water and at a temperature of from 140 to 180° C. when it is based on benzonitrile or tolunitrile, the volumetric ratio of said coolant to the amount of gas to be quenched being in the range of 1:5 to 1:100 and being such that a temperature below the boiling point of the coolant is maintained; and thereafter recovering said phthalonitriles from a bleed stream of said liquid coolant, and recycling the liquid coolant.

2. A process as claimed in claim 1 wherein water is used as the coolant and the pH of the water is adjusted to from 7 to 11.

3. A process as claimed in claim 2 wherein an ammonium carbonate level of from 3 to 12 percent by weight is maintained in the water used for cooling.

4. A process as claimed in claim 1, wherein the recycle stream of liquid coolant is replenished with make-up condensate to compensate for loss by evaporation.

References Cited
UNITED STATES PATENTS

| | | | |
|---|---|---|---|
| 2,232,836 | 2/1941 | Bowlus | 260—465 B |
| 2,846,462 | 8/1958 | Hadley | 260—465 C |
| 2,857,416 | 10/1958 | Ferstandig et al. | 260—465 B |
| 3,135,795 | 6/1964 | Gasson et al. | 260—465 C |
| 3,472,891 | 10/1969 | Ikeda et al. | 260—465 H |

JOSEPH P. BRUST, Primary Examiner

U.S. Cl. X.R.
260—465 C, 465 H